(12) United States Patent
Kawashima et al.

(10) Patent No.: US 6,354,607 B1
(45) Date of Patent: Mar. 12, 2002

(54) STABILIZER EFFECTIVENESS CONTROL DEVICE

(75) Inventors: Mitsunori Kawashima; Hirokazu Kitazawa; Shinji Suto; Yousuke Sekino, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/383,280

(22) Filed: Aug. 26, 1999

(30) Foreign Application Priority Data

Aug. 26, 1998 (JP) .......................... 10-240784
Aug. 26, 1998 (JP) .......................... 10-240791

(51) Int. Cl.⁷ .............................................. B62B 5/02
(52) U.S. Cl. .................................................. 280/5.511
(58) Field of Search .......................... 280/5.511, 5.512, 280/5.51, 5.509, 5.508, 5.506, 5.502, 5.5

(56) References Cited

U.S. PATENT DOCUMENTS

| | | | |
|---|---|---|---|
| 4,613,153 A | * 9/1986 | Shibahata et al. | 280/689 |
| 4,648,620 A | * 3/1987 | Nuss | 280/689 |
| 4,674,767 A | * 6/1987 | Kuroki et al. | 280/707 |
| 4,834,419 A | * 5/1989 | Kozaki et al. | 280/707 |
| 5,163,704 A | * 11/1992 | Wada | 280/707 |
| 5,186,486 A | * 2/1993 | Hynds et al. | 280/689 |
| 5,263,558 A | 11/1993 | Yamaoka | |
| 5,882,017 A | * 3/1999 | Carteer | 280/5.508 |
| 5,948,027 A | * 9/1999 | Oliver, Jr. et al. | 701/37 |
| 5,987,366 A | 11/1999 | JUn | |
| 6,022,030 A | * 2/2000 | Fehring | 280/5.511 |
| 6,097,999 A | * 8/2000 | Shal et al. | 701/38 |
| 6,179,310 B1 | * 1/2001 | Clare et al. | 280/124.159 |

FOREIGN PATENT DOCUMENTS

| | | | |
|---|---|---|---|
| DE | 41 34 730 A1 | 4/1992 | |
| DE | 196 54 562 A1 | 7/1997 | |
| JP | 4-191114 | 7/1992 | B06G/17/027 |

* cited by examiner

Primary Examiner—Brian L. Johnson
Assistant Examiner—Gerald Klebe
(74) Attorney, Agent, or Firm—Sughrue Mion, PLLC (57) ABSTRACT

A stabilizer effectiveness control device that has an actuator for changing the apparent torsion rigidity of a stabilizer provided between the left and right wheels of a motor vehicle, a control device for controlling the output of the actuator, and a device for detecting the degree of sharpness of a turn when the vehicle is turning. The actuator is driven and controlled in response to the degree of sharpness of the turn when the vehicle is turning so as to change the torsion rigidity of the stabilizer between the left and right wheels of the vehicle. When the sharpness of the turn is small the change in attitude of the vehicle body is controlled by the actuator to prioritize vehicle riding comfort, whereas when the degree of sharpness of the turn is increased the actuator bottoms out, thus allowing the intrinsic rigidity of the stabilizer to control the handling or running stability of the vehicle.

23 Claims, 9 Drawing Sheets

STABILIZER EFFECTIVENESS CONTROL DEVICE

BACKGROUND OF THE INVENTION

1. Field of the Invention

The present invention relates to a stabilizer effectiveness control device in which the apparent torsion rigidity of a stabilizer provided between left and right wheels is changed by an actuator.

2. Description of the Related Art

A device is known in which the apparent torsion rigidity of a stabilizer comprising a torsion bar is changed by using an electromagnetic actuator to thereby control change in attitude of a vehicle which is turning (refer to Japanese Unexamined Patent Publication (kokai) No. HEI 4-191114). In a control device like this, it is common practice to control the output of the actuator based mainly on a lateral acceleration value.

In the above conventional apparatus, the control device controls the actuator so that it is contracted/expanded in a direction in which a roll angle generated while the vehicle is turning is cancelled. Specifically, an actuator is normally mounted at one or both ends of a stabilizer and it is controlled such that the actuator so mounted generates a force that can counter a load applied to an outside wheel while the vehicle is turning in response to a running speed. Thus, with this construction, when the vehicle is running at high speeds, a roll angle is controlled so as to be small to increase the rigidity to thereby improve the road holding feeling of the tire, while running at low speeds, the rigidity is controlled so as to be slightly lowered to improve the riding comfort.

However, if a large lateral acceleration or yaw rate is generated not from a high vehicle speed but from a sharp turn of the vehicle, it is desirable to stabilize the vehicle behavior. Conversely, in the case where the lateral acceleration or yaw rate remains small even when the vehicles run at high speeds, or the vehicle runs in a stable fashion even at high speeds, it is desirable that importance is attached to the riding comfort.

SUMMARY OF THE INVENTION

It is an object of the present invention to provide a stabilizer effectiveness control device that can improve not only the running stability but also the riding comfort of a vehicle while it is turning.

According to the present invention, a stabilizer effectiveness control device comprises: an actuator for changing an apparent torsion rigidity of a stabilizer provided between left and right wheels; control means for controlling an output of said actuator; and means for detecting the degree of sharpness of a turn when a vehicle is turning; wherein said actuator is driven and controlled in response to the degree of sharpness of a turn when the vehicle is turning so as to change the apparent torsion rigidity of said stabilizer. According to this construction, in an area where the degree of sharpness of a turn (for instance, actual or estimated lateral acceleration or yaw rate) is small, the change in attitude of a vehicle body is controlled by the actuator 1 such that importance is attached to the riding comfort, and as the degree of sharpness of a turn gets greater, the change in attitude of the vehicle is then controlled such that the actuator 1 having a narrow movement range bottoms and that importance is placed on the running stability provided by the rigidity intrinsic in the stabilizer R.

Further, according to the present invention, a stabilizer effectiveness control device comprises: an electromagnetic actuator for changing an apparent torsion rigidity of a stabilizer provided between left and right wheels of at least one of front and rear wheels; control means for controlling an output of said actuator; bottoming detecting means for detecting that said actuator reaches an extremity of a movable range thereof; wherein the movable range of said actuator is made narrower than a movable range of said left and right wheels; and energizing of said actuator is stopped when said actuator reaches the extremity of the movable range thereof. According to this construction, the vehicle body attitude change (rolling) when the roll angle is small is controlled by the actuator 1, while when the roll angle is large, the actuator first bottoms and thereafter the vehicle body attitude change is controlled by the rigidity intrinsic in the stabilizer, when energizing of the actuator is stopped.

PREFERRED EMBODIMENT OF THE INVENTION

The present invention will be described in detail below referring to the accompanying drawings.

Figure 1:
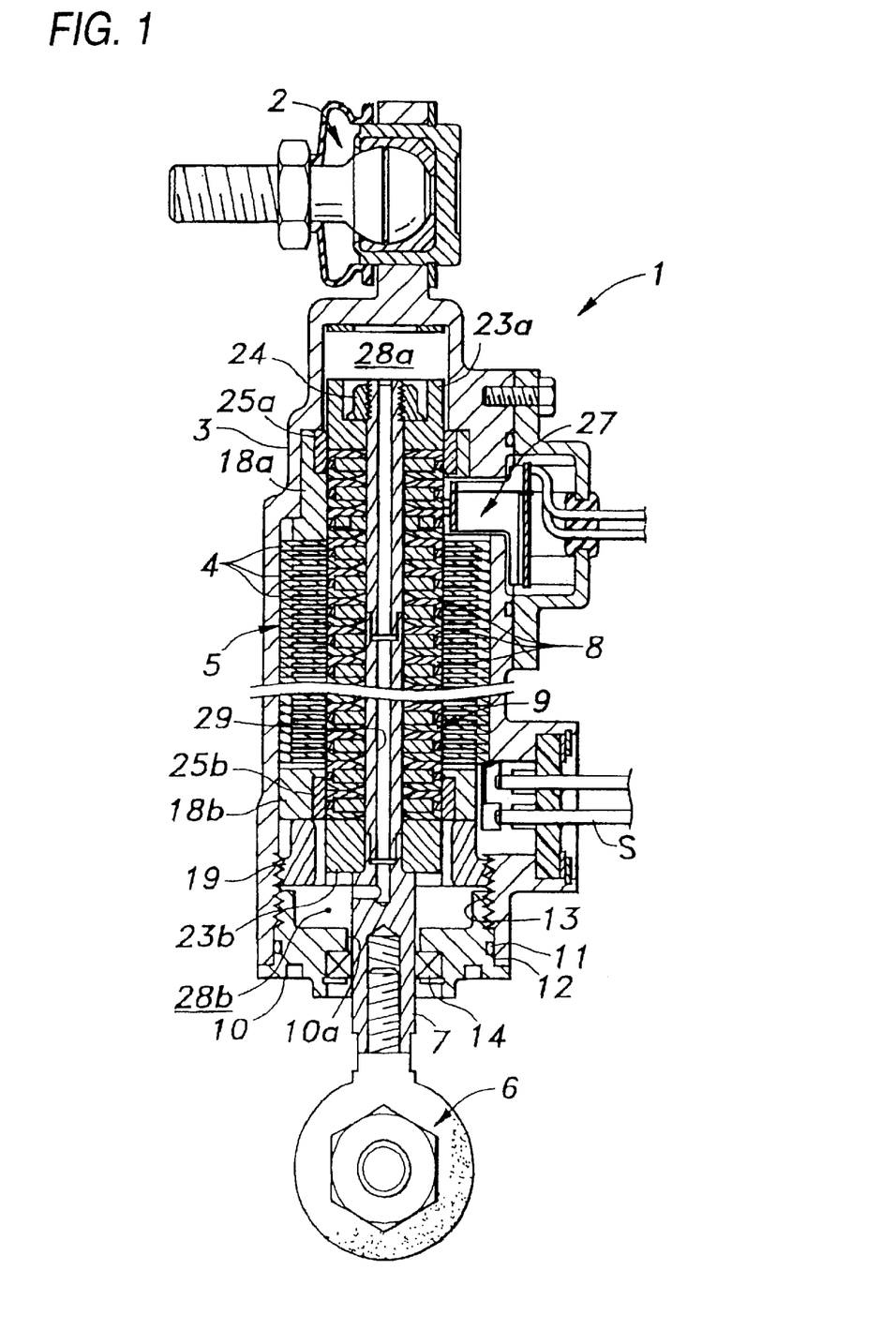
FIG. 1 is a vertical cross-section of an electromagnetic linear actuator of a stabilizer effectiveness control device to which the present invention is applied.

FIG. 1 shows an electromagnetic linear actuator (hereinafter, referred to as actuator) to which the present invention is applied. This actuator 1 comprises, a bottomed cylindrical case 3, a stator 5, a rod 7 and an armature 9. The bottomed cylindrical case 3 has a joint 2 having a ball stud provided on a top surface thereof. The stator 5 consists of a number of solenoid pieces 4 stacked in an axial direction along an internal circumferential surface of the case 3 in an annular configuration. The rod 7 extends on a central axis of the case 3 and has a joint 6 composed of a ball stud provided at one end thereof protruding from an opening of the case 3. The armature 9 is composed of a number of pole pieces 8 stacked along an outer circumferential surface of the rod 7.

A cap 10 having a central hole 10a through which the rod 7 is allowed to pass tightly closes the opening of the case 3. This cap 10 is air tightly fitted in an end of the opening at a spigot joint 12 thereof via O-ring 11 and is also screw fitted in female threads formed inwardly of the opening. In addition, airtight sealing is established between the internal circumference of the central hole 10a of the cap 10 and the outer circumference of the rod 7 with a seal member 14.

Here, the case 3 is described as opening downwardly for the sake of convenience, but it is needless to say that practically the present invention is not limited to such a construction.

Figure 2:
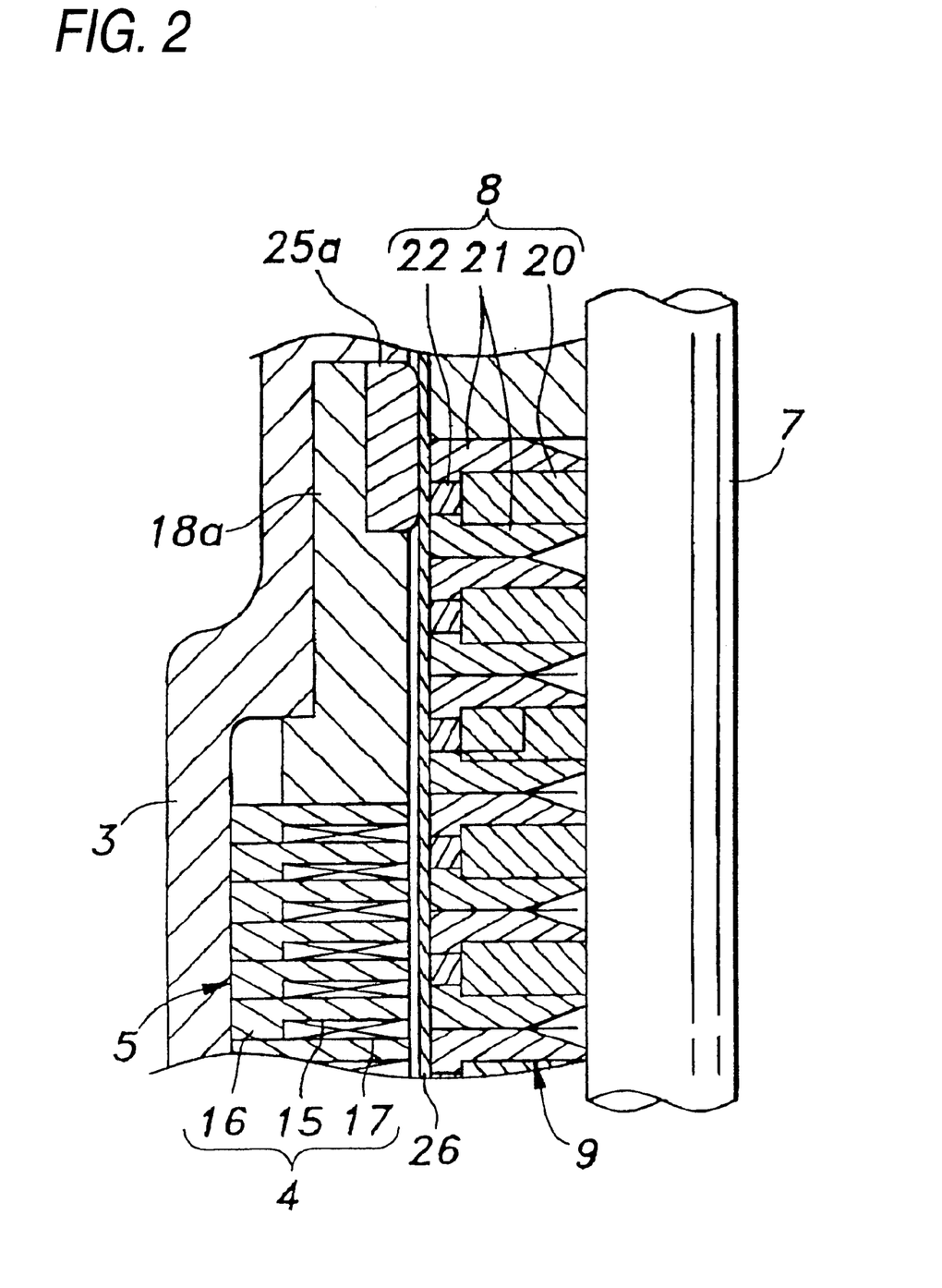
FIG. 2 is an enlarged cross-section of a solenoid and a pole piece.

As shown in FIG. 2, the solenoid pieces 4 constituting the stator 5 composed of coils 17 in which a conductor is wound around a thin bobbin 16 of a soft magnetic iron material and having an indentation 15 formed in an internal circumference thereof. The stator 5 is held at axial ends of the number of stacked solenoid pieces 4 by end collars 18a, 18b and is then clamped by a hollow nut 19 screw fitted in female threads 13 formed in the internal circumferential surface of the open end of the case 3. In addition, the coils 17 are arranged such that three coils form a set of the coils in the stacked order and that those three coils are connected to one another through delta connection. The coils 17 so arranged are then connected to a feed lead wire S.

As shown in FIG. 2, the armature 9 is composed of a number of pole pieces 8 stacked over the rod 7, each pole piece 8 comprising an annular permanent magnet 20, a pair of annular yokes 21 of a soft magnetic iron material adapted to hold the annular permanent magnet from above and below and a magnetic shield ring 22 held between the pair of yokes 28 on an outer circumferential side thereof. The armature 9 is then held at ends of the number of stacked pole pieces 8 by end collars 23a, 23b and is integrally connected to the rod 7 by a nut 24 screw fitted in a top end of the rod 7.

In these pole pieces 8 arranged side by side with one another, an S-poles confrontation and an N-poles confrontation are arranged so as to occur in an alternate fashion.

This armature 9 is slidably supported on oilless slide bushings 25a, 25b of a sintered alloy securely fitted, respectively, in the end collars 18a, 18b which hold the stator 5 at the ends thereof and is adapted to move in axial directions together with the rod 7. Here, in order to reduce frictional resistance relative to the slide bushings 25a, 25b and prevent wear thereof, an outer circumferential surface of the armature 9 is abraded and then a hard film 26 of hard chrome is formed on the abraded surface. This hard film 26 may be formed on at least a portion of the surface where the slide bushings 25a, 25b are brought into sliding contact therewith, but in view of an anti-corrosion effect provided by the film, the film may be applied to the entirety of the surface.

As described above, with synchronizing the output of the detection unit of the pole piece position using the hole element, each pair of solenoid pieces are sequentially magnetized so that the linear motor type actuator 1 in which the rod 7 is linearly moved is constituted by the shaft force generated in the armature 9. Incidentally, since the principle of the linear motor is well known, the further explanation is omitted.

The case 3 encapsulates the rod 7 and the armature 9 together, and empty chambers 28a, 28b are formed between the top surface of the case 3 and an inner surface of the cap 10 and the axial ends of the armature 9, respectively. The capacity of these two empty chambers 28a, 28b changes as the armature 9 moves. Therefore in order to balance internal pressures in both the empty chambers 28a, 28b, there is a vent passage 29 provided in the center of the rod 7 for establishing a communication between both the empty chambers 28a, 28b.

Figure 3:
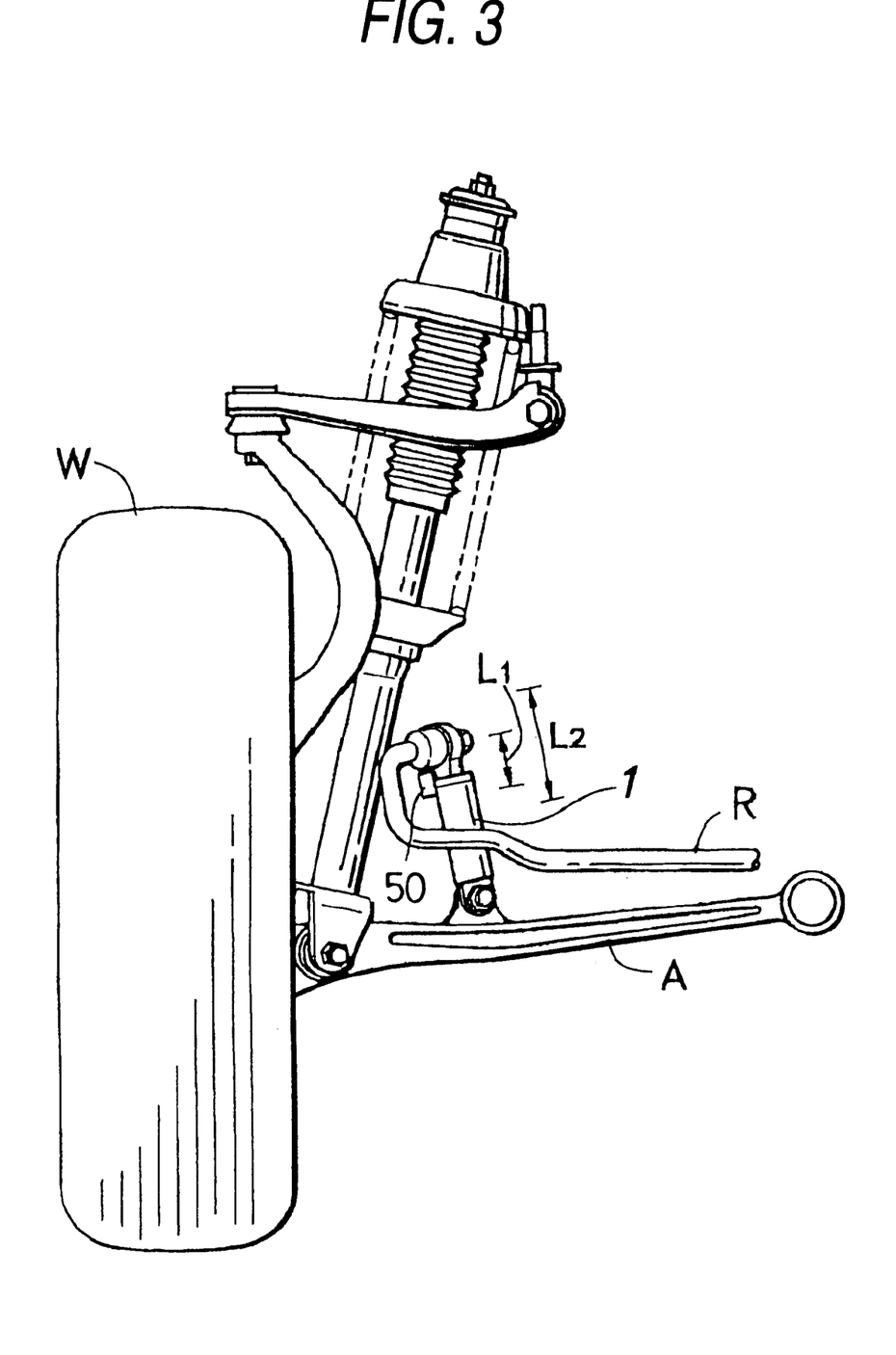
FIG. 3 is a front view of a main part of a suspension system to which the present invention is applied.

FIG. 3 illustrates one side of a suspension system in which a stabilizer R constituted by a torsion bar is connected to left and right suspension arms A at ends thereof via the aforesaid actuator 1. As is known, the stabilizer R has substantially no effect when left and right wheels W move in vertical directions in the same phase. However, when the left and right wheels W move vertically in opposite phases, the stabilizer R is constructed so as to impart a suppression force relative to such vertical movements by virtue of the torsion rigidity thereof. With higher torsion rigidity, there is caused less change in attitude of the vehicle body during turning, while with lower torsion rigidity, the riding comfort on flat roads is improved. In other words, the torsion rigidity of the stabilizer R is determined by a compromise made between the stability during turning and the riding comfort on flat roads.

For instance, when one of the wheels W rides on something projecting from the surface of a flat road while running thereon, with a normal vehicle, since there is generated a force for checking the rise of the wheel through function of the stabilizer R, the riding comfort is deteriorated, but with the actuator 1 being fitted on the one of the wheels W, the actuator is then contracted so as to absorb the force so generated by the stabilizer R, whereby the transmission of vibrations to the vehicle body is made difficult. On the contrary, when the one of the wheels W drops in a recessed portion in the road, the actuator 1 is then expanded to thereby absorb a force from the stabilizer. In other words, the apparent torsion rigidity of the stabilizer R can be changed by providing the actuator 1 on at least on left or right end of the stabilizer R, allowing it to be expanded or contracted as required, and controlling the thrust thereof. In other words, according to the device of the present invention, with the characteristics of the stabilizer R being set such that importance be attached to the stability during turning, the riding comfort on flat roads can be improved by allowing the actuator 1 to be put into operation as required.

As shown in FIG. 3, here, the stroke range (i.e., the movable range) L1 of the actuator 1 is made narrower than the stroke range (i.e., the movable range) L2 of the left and right wheels W (L1<L2). Consequently, when a force greater than the driving force of the actuator 1 is inputted, the actuator 1 bottoms, and thereafter, a reaction force is generated only through the torsion rigidity of the stabilizer R.

Figure 4A:
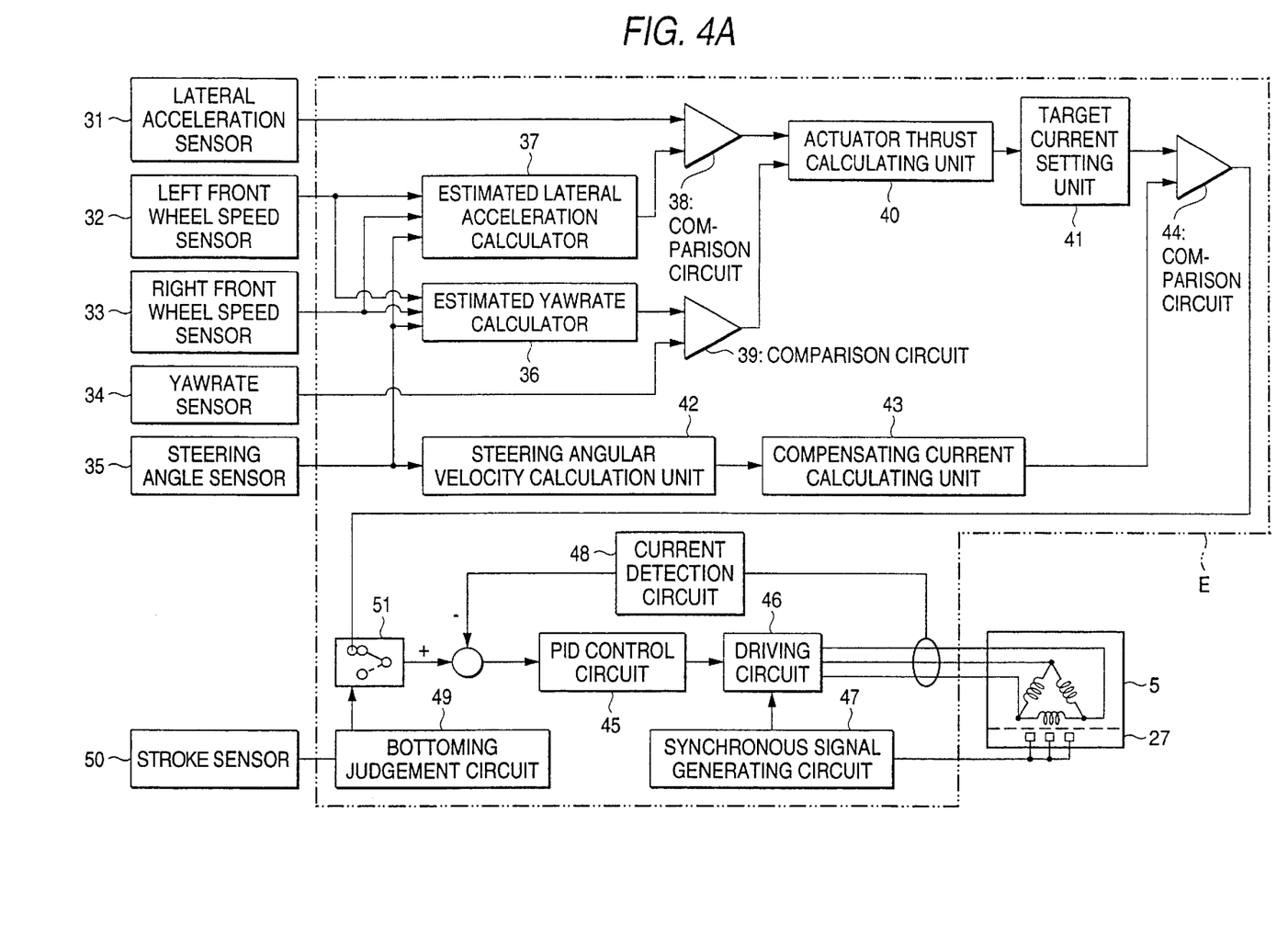
FIG. 4A is a block diagram showing a control system of the present invention.

Next, a general driving control of the actuator 1 will be described, referring to FIG. 4A.

An electronic control unit E for controlling the device of the present invention in a centralized fashion takes in outputs from a lateral acceleration sensor 31, a left front wheel speed sensor 32, a right front wheel speed sensor 33, a yaw rate sensor 34 and a steering angle sensor 35, and an estimated yaw rate calculator 36 calculates an estimated yaw rate from a steering angle and a wheel speed difference between the left and right wheels, an estimated lateral acceleration calculator 37 calculating an estimated acceleration from a steering angle and an average value of wheel speeds.

Estimated values and detected values of lateral acceleration and yaw rate are inputted, respectively, into comparison circuits 38, 39, and the larger value of the estimated and detected values of both the lateral acceleration and raw rate are then input into an actuator thrust calculating unit 40. This is a procedure taken to compensate for a delay in response of sensor outputs.

Figure 4B:
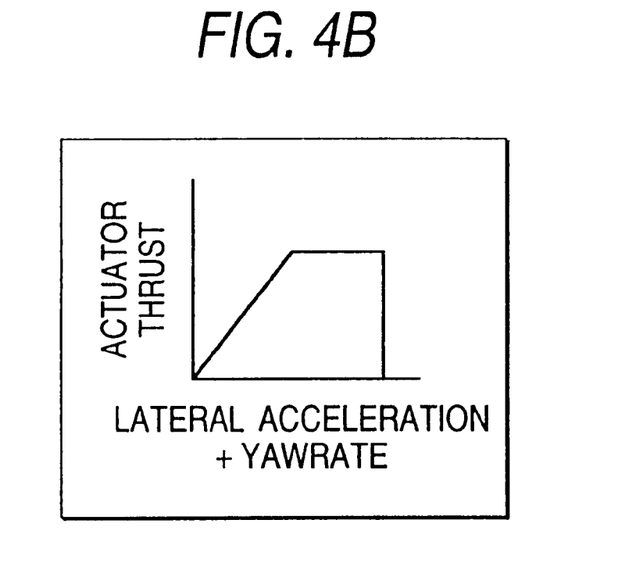
FIG. 4B shows an example of a map stored in an actuator thrust calculating unit.

Since the thrust calculating unit 40 stores relationships between added values of the lateral accelerations and yaw rates and the trust in a map, for example as shown in FIG. 4B, or formula fashion, a thrust value is calculated based on lateral accelerations and yaw rates, and a value so calculated is then inputted into a target current setting unit 41 for conversion of the trust into a current value.

Figure 4C:
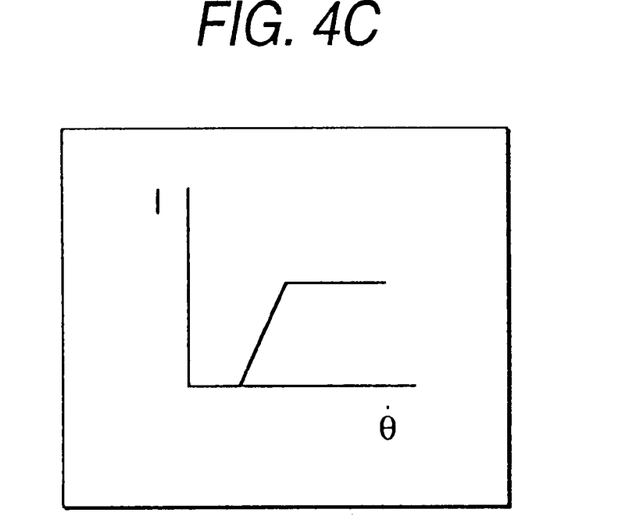
FIG. 4C shows an example of a map stored in a compensating current calculating unit.

On the other hand, a steering angular velocity is calculated by differentiating an output from the steering angle sensor 35 by a steering angular velocity calculating unit 42. A value so obtained is then inputted into a compensating current calculating unit 43 when steering of the vehicle is initiated. Consequently, a target current value corresponding to the present steering angular velocity is outputted from the relationship set in advance as in the form of a map, for example as shown in FIG. 4C, between the steering angular velocity and the current value.

This output is inputted into a comparison circuit together with an output from the target current setting unit 41, with a larger of the two outputs being outputted from a PID control circuit 45. This is a control based on the understanding that a quick steering comes with a larger initial steering angular velocity, and is a procedure to be taken to set a larger target current value at the start of a quick steering to thereby improve the effectiveness of the stabilizer R. An exciting current is supplied to the stator 5 composed of the coils 17 which are three-phase delta connected to one another via a driving circuit 46 in response to a synchronous signal generated by a synchronous signal generating circuit 47 based on an output from a position detecting unit 27. The actuator 1 is expanded/contracted so as to optimize the torsion rigidity of the stabilizer R by feeding back an actual current from a current detection circuit 48.

On the other hand, an output from a stroke sensor 50 provided on the actuator 1 is designed to be inputted into a bottoming judgement circuit 49. When the actuator 1 reaches the extremity of the movable range thereof, that is, when bottoming of the actuator 1 is detected, the bottoming judgement circuit 49 outputs a bottoming signal based on the judgement thereof. According to the bottoming signal, a switching relay 51 is turned off to cut off the output from the comparator 44 so that energizing of the actuator 1 by the driving circuit 48 is stopped.

Figure 5:
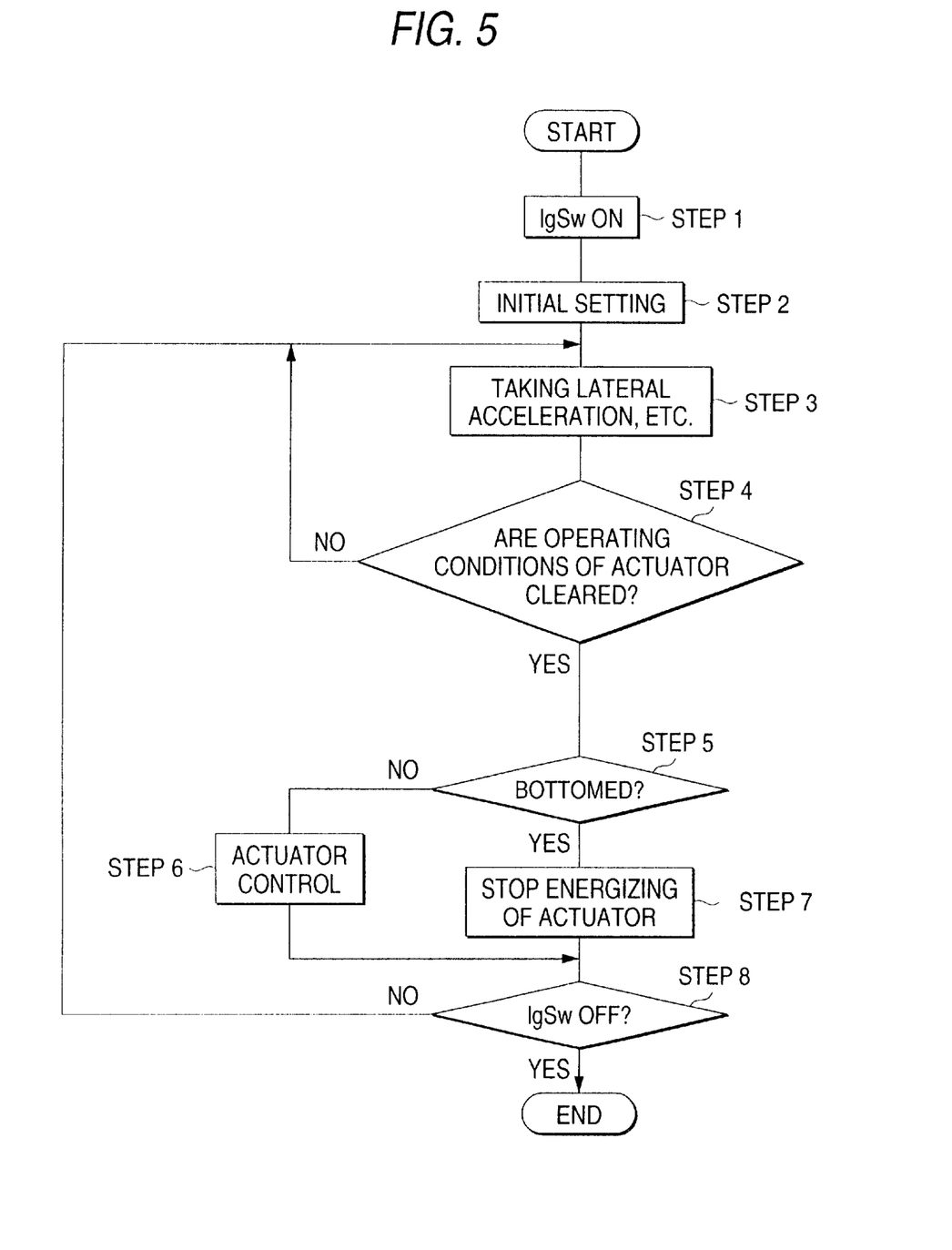
FIG. 5 is a basic control flow chart of the present invention.

When an ignition switch of the vehicle is switched on (step 1), the electronic control unit E performs a self-diagnosis operation and initial setting (step 2). Next, the unit takes in a lateral acceleration, a vehicle speed and a steering angle (step 3), and judges whether or not the operating conditions of the actuator 1 are cleared (step 4). If cleared, advance to step 5, whether or not the actuator 1 has reached the extremity of the movable range, or if the actuator 1 has bottomed is judged. If is has not bottomed, at step 6, the actuator 1 is operated so as to be expanded and/or contracted as described above. If it is judged as having bottomed, then energizing of the actuator 1 is stopped (step 7), and advance to step 8, where processes from steps 3 to 7 are repeated until the ignition switch is judged as being switched off.

Figure 6:
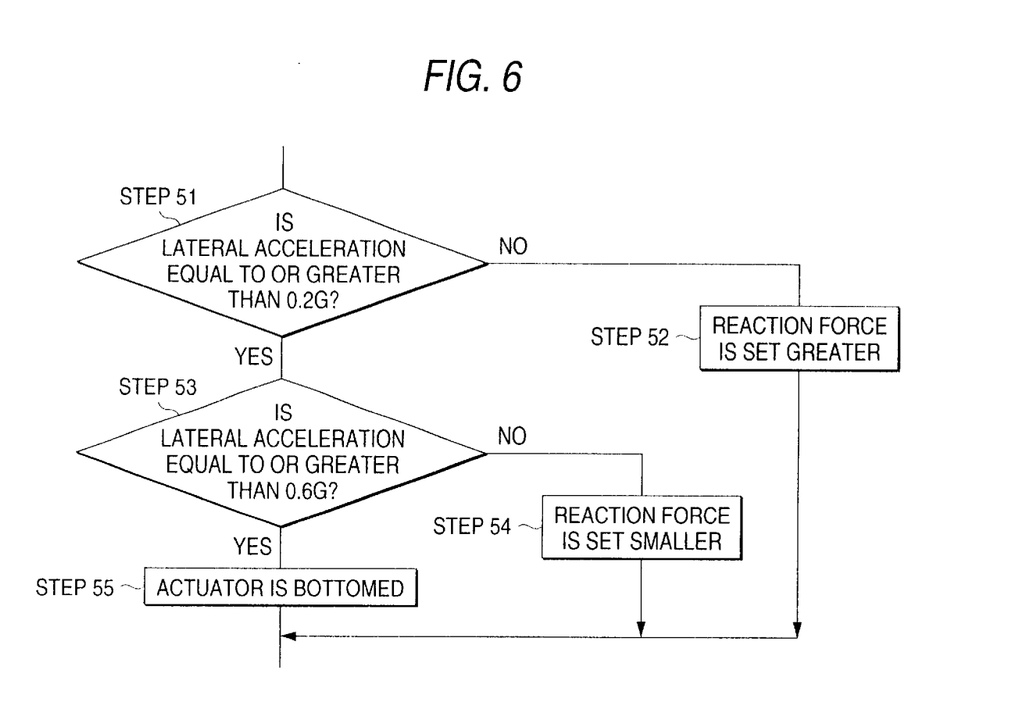
FIG. 6 is a detailed control flow char of the present invention.

Here, referring to FIG. 6, the process at step 5 will be described in detail. First, at step 51, whether or not the lateral acceleration, which is regarded as the degree of sharpness of turn, is equal to or greater than 0.2 g is judged. If judged as being smaller than that value, it is adjusted so as to have a greater reaction force, i.e., a reaction force that would be obtained when a stabilizer is used (step 52). In addition, if judged that the lateral acceleration is equal to or greater than 0.2 g, whether or not the lateral acceleration is equal to or greater than 0.6 g is further judged (step 53). If judged as being smaller than that value, i.e., the lateral acceleration is judged as being between 0.2 g and 0.6 g, it is adjusted so as to have a smaller reaction force, i.e., a reaction force that would be provided when a soft stabilizer is used (step 54). In addition, if judged as being equal to or greater than 0.6 g, it is set such that the actuator 1 bottoms (step 55), and the actuator is then actually driven and so controlled.

Figure 7:
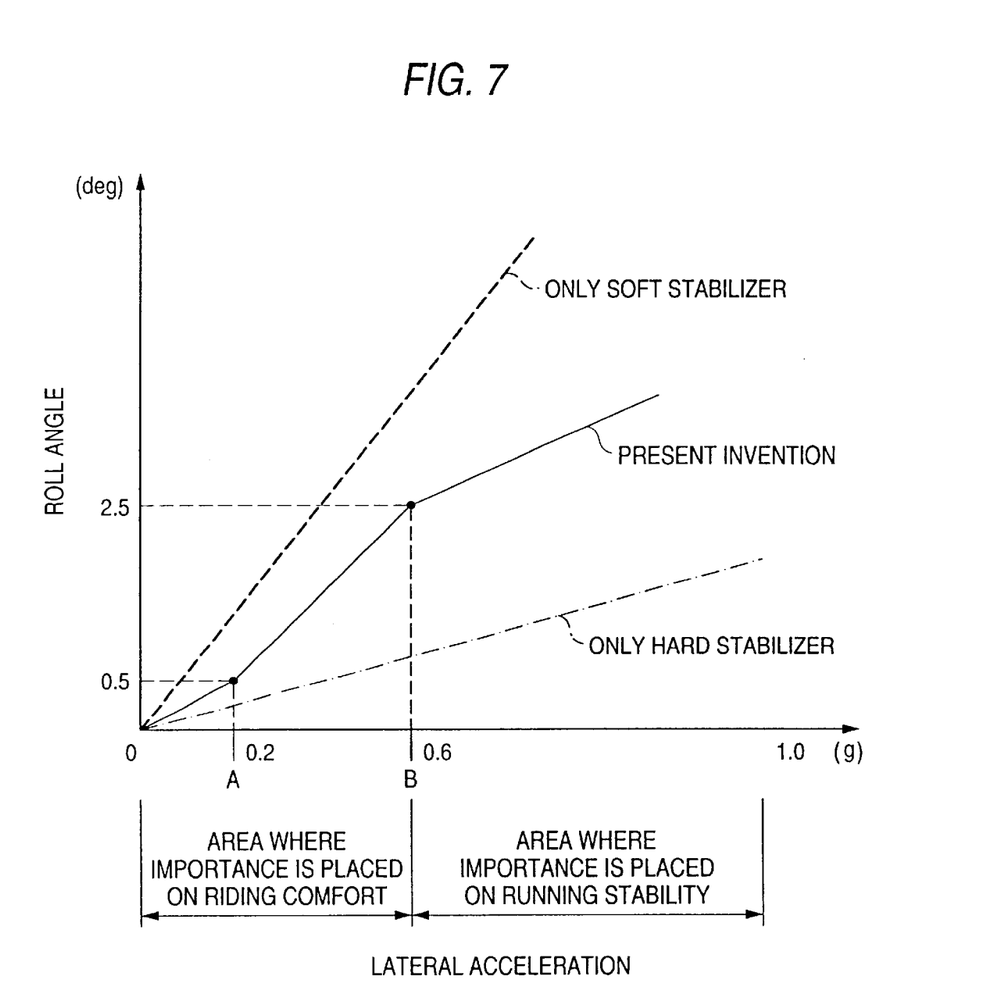
FIG. 7 is a graph explaining operational characteristics between roll range and lateral acceleration of a stabilizer to which the present invention is applied.

FIG. 7 illustrates a relationship between the roll angle of the vehicle and the lateral acceleration when a stabilizer to which the present invention is applied is used as a hard stabilizer consisting of only a stabilizer bar and used as a soft stabilizer consisting of only a stabilizer bar. With the hard stabilizer and the soft stabilizer both consisting of only a stabilizer bar, the roll angle remains constant irrespective of the lateral accelerations.

On the other hand, in the stabilizer to which the present invention is applied, it is adjusted such that the thrust of the actuator 1 overcomes an external force in a range in which the roll angle is small (from origin to point A (0.2 g)) and that change in roll angle becomes the same as in a case where a hard stabilizer is used. In a range in which the roll angle becomes slightly large (from point A to point B (0.6 g)), it is adjusted such that the thrust of the actuator 1 is overcome by an external force, whereby that the actuator 1 is gradually pushed back and that change in roll angle becomes the same as in a case where a soft stabilizer is used. Then, the actuator 1 is caused to bottom at point B, and thereafter (rightward from point B) only mechanical reaction force that would be provided by a relatively hard stabilizer is caused to remain effective. Here, it is constructed that energizing of the actuator 1 is stopped when point B is reached from point A, whereby power consumption is suppressed. It is needless to say that when the roll angle starts to become smaller again and point B is reached from the right-hand side of the graph, then the actuator 1 is re-energized to perform the aforesaid operations.

In this embodiment, the actuator 1 is described as an electromagnetic linear actuator, but a rotary electromagnetic actuator or a conventional hydraulic actuator may be used. Moreover, a separate link member or the like may be interposed between the actuator and the stabilizer.

Moreover, in the above embodiment of the present invention, the degree of sharpness of a turn of a vehicle is judged by detecting a lateral acceleration, but it may be judged by detecting a yaw rate, or by estimating lateral acceleration and yaw rate from steering angle and wheel or vehicle speed.

According to the present invention, change in attitude of a vehicle body can be controlled such that within a region where the degree of sharpness of a turn is small, the characteristics of a vehicle is adjusted by the actuator such that importance is placed on the riding comfort, while within a range where the degree of sharpness of a turn is large, the characteristics of the vehicle is then changed such that importance is placed on the running stability by causing the actuator 1 to bottom and allowing the rigidity intrinsic in the stabilizer to work, whereby the characteristics of the vehicle can be changed suitably and elaborately, thereby making it possible to improve the riding comfort and the running stability as well.

Figure 8:
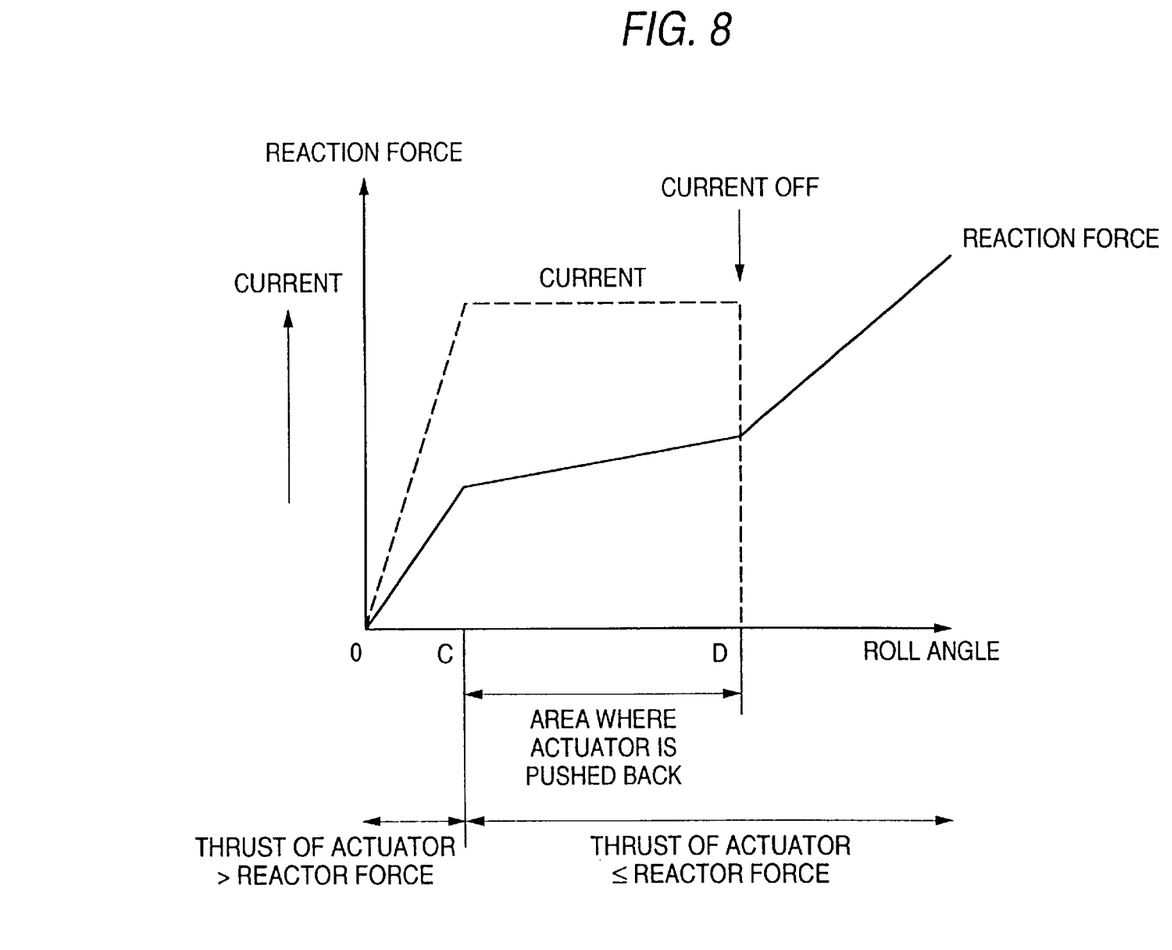
FIG. 8 is a graph explaining operational characteristics between current and roll range of a stabilizer to which the present invention is applied.

FIG. 8 shows a relationship between a roll angle of a vehicle and a reaction force (a resulting force of a mechanical reaction force generated by the stabilizer R and a thrust generated by the actuator 1) and current to be supplied to the actuator 1. In a range (from origin to point C) where the roll angle is small, since the thrust of the actuator 1 overcomes an external force, a reaction provided is similar to that provided when a hard stabilizer is used. In a range (from point C to point D) where the roll angle is large, the thrust of the actuator 1 is overcome by an external force and the actuator 1 is gradually pushed back, a reaction obtained is similar to that provided when a soft stabilizer is used. Then, at point D the actuator reaches an extremity of the movable range thereof, i.e., the actuator bottoms, and thereafter (rightward from point D) only a relatively hard mechanical reaction force is obtained which is provided by the stabilizer R. Here at a point where point D is reached from the side of point C, energizing of the actuator 1 is stopped, whereby the power consumption is suppressed (see a dotted line). Then, when the roll angle starts to become smaller, and point D is reached from the right-hand side of the graph, needless to say, the energizing of the actuator is resumed and the aforesaid control is performed.

In addition, in the embodiment of the present invention, the actuator is described as an electromagnetic linear motor, but a rotary electromagnetic actuator may be used, and a separate link member may be interposed between the actuator and the stabilizer. Further, in the above embodiment, the stroke sensor is used for detecting bottoming of the actuator, but bottoming may be detected by a limit switch, or it may be detected by estimating bottoming from a detected lateral acceleration, or by first estimating a lateral acceleration from a steering angle and a vehicle speed, then estimating bottoming from a lateral acceleration so estimated.

Thus, according to the present invention, the movable range of the electromagnetic actuator for changing the apparent torsion rigidity of the stabilizer is made narrower than the movable range of the left and right wheels, and when the actuator reaches the extremity of the movable range thereof, in other words, when bottoming of the actuator is detected, energizing of the actuator is stopped. Accordingly, the vehicle body attitude change (rolling) is controlled which occurs in the initial stage of turning where the roll angle is small, while when the roll angle is getting larger, the actuator having a narrower movable range first bottoms, and thereafter energizing of the actuator is stopped, so that the power consumption is markedly reduced.

What is claimed is:

1. A stabilizer effectiveness control device comprising:
    an actuator for changing an apparent torsion rigidity of a stabilizer provided between left and right wheels;
    control means for controlling an output of said actuator; and
    means for detecting the degree of sharpness of a turn when a vehicle is turning;
    wherein said actuator is driven and controlled in response to the degree of sharpness of a turn when the vehicle is turning so as to change the apparent torsion rigidity of said stabilizer; and
    wherein said means for detecting the degree of sharpness of said turn detects at least one of a left wheel speed and a right wheel speed and inputs a corresponding signal to said control means.

2. A stabilizer effectiveness control device comprising:
    an actuator for changing an apparent torsion rigidity of a stabilizer provided between left and right wheels;
    control means for controlling an output of said actuator; and
    means for detecting the degree of sharpness of a turn when a vehicle is turning;
    wherein said actuator is driven and controlled in response to the degree of sharpness of a turn when the vehicle is turning so as to change the apparent torsion rigidity of said stabilizer; and
    wherein said control means controls said actuator such that energizing of said actuator is stopped when said actuator reaches an extremity of a movable range thereof.

3. A stabilizer effectiveness control device comprising:
    an actuator for changing an apparent torsion rigidity of a stabilizer provided between left and right wheels;
    control means for controlling an output of said actuator; and
    means for detecting the degree of sharpness of a turn when a vehicle is turning;
    wherein said actuator is driven and controlled in response to the degree of sharpness of a turn when the vehicle is turning so as to change the apparent torsion rigidity of said stabilizer; and
    wherein said control means judges at least a first threshold value and a second threshold value of the degree of sharpness of the turn, wherein said first threshold value is less than said second threshold value, and wherein said control means controls said actuator in at least a first reaction force range and a second reaction force range, wherein said actuator is controlled in said first reaction force range when the degree of sharpness of the turn is less than said first threshold value and said actuator is controlled in said second reaction force range when the degree of sharpness of the turn is between said first threshold value and said second threshold value.

4. The stabilizer effectiveness control device according to claim 3, wherein said control means ceases to control said actuator when said degree of sharpness of the turn is greater than said second threshold value.

5. A stabilizer effectiveness control device comprising:
    an electromagnetic actuator for changing an apparent torsion rigidity of a stabilizer provided between left and right wheels of at least one of front and rear wheels;
    control means for controlling an output of said actuator;
    bottoming detecting means for detecting that said actuator reaches an extremity of a movable range thereof;
    wherein the movable range of said actuator is made narrower than a movable range of said left and light wheels; and
    energizing of said actuator is stopped when said actuator reaches the extremity of the movable range thereof.

6. The stabilizer effectiveness control device according to claim 5, wherein said control means takes in output signals from a lateral acceleration sensor for controlling an output of said actuator.

7. The stabilizer effectiveness control device according to claim 5, wherein said control means takes in output signals from at least one of a left wheel speed sensor and a right wheel speed sensor for controlling an output of said actuator.

8. The stabilizer effectiveness control device according to claim 5, wherein said control means takes in output signals from a yaw rate sensor for controlling an output of said actuator.

9. The stabilizer effectiveness control device according to claim 5, wherein said control means takes in output signals from a steering angle sensor for controlling an output of said actuator.

10. The stabilizer effectiveness control device according to claim 5, wherein said control means judges at least a first threshold value and a second threshold value of a degree of sharpness of a turn of a vehicle, wherein said first threshold value is less than said second threshold value, and wherein said control means controls said actuator in at least a first reaction force range and a second reaction force range, wherein said actuator is controlled in said first reaction force range when the degree of sharpness of the turn is less than said first threshold value and said actuator is controlled in said second reaction force range when the degree of sharpness of the turn is between said first threshold value and said second threshold value.

11. The stabilizer effectiveness control device according to claim 10, wherein said control means ceases to control said actuator when said degree of sharpness of the turn is greater than said second threshold value.

12. A stabilizer effectiveness control device comprising:

an actuator for changing an apparent torsion rigidity of a stabilizer provided between left and right wheels;

a controller that controls an output of said actuator; and a detector that detects the degree of sharpness of a turn when a vehicle is turning;

wherein said actuator is driven and controlled in response to the degree of sharpness of a turn when the vehicle is turning so as to change the apparent torsion rigidity of said stabilizer; and wherein said detector detects at least one of a left wheel speed and a right wheel speed and inputs a corresponding signal to said controller.

13. A stabilizer effectiveness control device comprising:

an actuator for changing an apparent torsion rigidity of a stabilizer provided between left and right wheels;

a controller that controls an output of said actuator; and a detector that detects the degree of sharpness of a turn when a vehicle is turning;

wherein said actuator is driven and controlled in response to the degree of sharpness of a turn when the vehicle is turning so as to change the apparent torsion rigidity of said stabilizer; and wherein said controller judges at least a first threshold value and a second threshold value of the degree of sharpness of the turn, wherein said first threshold value is less than said second threshold value, and wherein said controller controls said actuator in at least a first reaction force range and a second reaction force range, wherein said actuator is controlled in said first reaction force range when the degree of sharpness of the turn is less than said first threshold value and said actuator is controlled in said second reaction force range when the degree of sharpness of the turn is between said first threshold value and said second threshold value.

14. The stabilizer effectiveness control device according to claim 13, wherein said controller ceases to control said actuator when said degree of sharpness of the turn is greater than said second threshold value.

15. The stabilizer effectiveness control device according to claim 14, wherein a minimum value of said first reaction force range is equal to or greater than a maximum value of said second reaction force range.

16. A stabilizer effectiveness control device comprising:

an actuator for changing an apparent torsion rigidity of a stabilizer provided between left and right wheels;

a controller that controls an output of said actuator; and a detector that detects the degree of sharpness of a turn when a vehicle is turning;

wherein said actuator is driven and controlled in response to the degree of sharpness of a turn when the vehicle is turning so as to change the apparent torsion rigidity of said stabilizer; and wherein said controller comprises an estimated yaw rate calculator which calculates an estimated yaw rate from an output of a steering angle sensor and a difference in outputs of a left wheel speed sensor and a right wheel speed sensor.

17. A stabilizer effectiveness control device comprising:

an actuator for changing an apparent torsion rigidity of a stabilizer provided between left and right wheels;

a controller that controls an output of said actuator; and a detector that detects the degree of sharpness of a turn when a vehicle is turning;

wherein said actuator is driven and controlled in response to the degree of sharpness of a turn when the vehicle is turning so as to change the apparent torsion rigidity of said stabilizer; and wherein said controller comprises an estimated lateral acceleration calculator which calculates an estimated lateral acceleration from an output of a steering angle sensor and an average of outputs of a left wheel speed sensor and a right wheel speed sensor.

18. A stabilizer effectiveness control device comprising:

an actuator for changing an apparent torsion rigidity of a stabilizer provided between left and right wheels;

a controller that controls an output of said actuator; and a detector that detects the degree of sharpness of a turn when a vehicle is turning;

wherein said actuator is driven and controlled in response to the degree of sharpness of a turn when the vehicle is turning so as to change the apparent torsion rigidity of said stabilizer; and wherein said controller comprises an estimated yaw rate calculator which calculates an estimated yaw rate from an output of a steering angle sensor and a difference in outputs of a left wheel speed sensor and a right wheel speed sensor, and an estimated lateral acceleration calculator which calculates an estimated lateral acceleration from said output of said steering angle sensor and said difference of outputs of said left wheel speed sensor and said right wheel speed sensor.

19. A stabilizer effectiveness control device comprising:

an electromagnetic actuator for changing an apparent torsion rigidity of a stabilizer provided between left and right wheels of at least one of front and rear wheels;

a controller that controls an output of said actuator;

a bottoming detector that detects that said actuator reaches an extremity of a movable range thereof;

wherein the movable range of said actuator is made narrower than a movable range of said left and light wheels; and energizing of said actuator is stopped when said actuator reaches the extremity of the movable range thereof.

20. The stabilizer effectiveness control device according to claim 19, wherein said controller controls an output of said actuator based on output signals from a lateral acceleration sensor.

21. The stabilizer effectiveness control device according to claim 19, wherein said controller controls an output of said actuator based on output signals from at least one of a left wheel speed sensor and a right wheel speed sensor.

22. The stabilizer effectiveness control device according to claim 19, wherein said controller controls an output of said actuator based on output signals from a yaw rate sensor.

23. The stabilizer effectiveness control device according to claim 19, wherein said controller controls an output of said actuator based on output signals from a steering angle sensor.

* * * * *